A. R. Reese,
Harvester Cutter.

No. 35,041.  Patented April 22, 1862.

UNITED STATES PATENT OFFICE.

ADAM R. REESE, OF PHILLIPSBURG, NEW JERSEY.

IMPROVEMENT IN FINGER-BEAMS FOR HARVESTERS.

Specification forming part of Letters Patent No. 35,041, dated April 22, 1862.

*To all whom it may concern:*

Be it known that I, ADAM R. REESE, of Phillipsburg, in the county of Warren and State of New Jersey, have invented certain new and useful Improvement in Finger-Beams for Harvesting-Machines, of which the following is a full, clear, and exact description, reference being had to the accompanying drawings, which make part of this specification, and in which—

Figure 1:
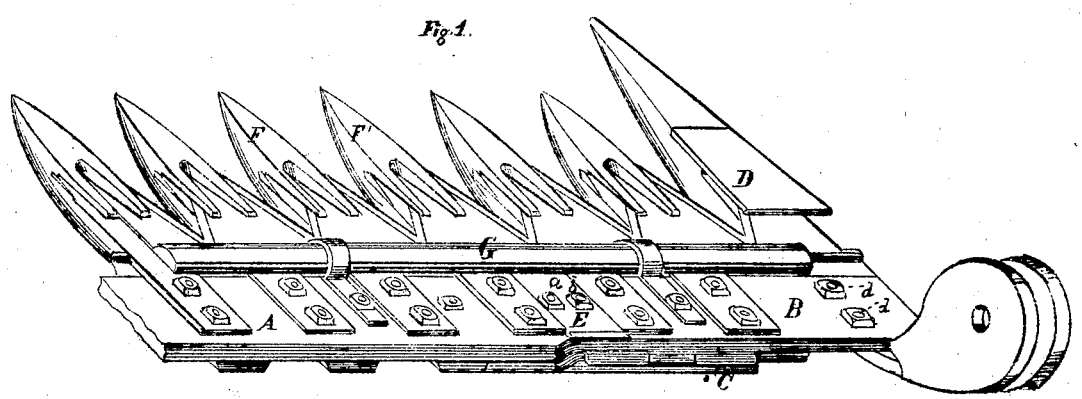
Figure 2:
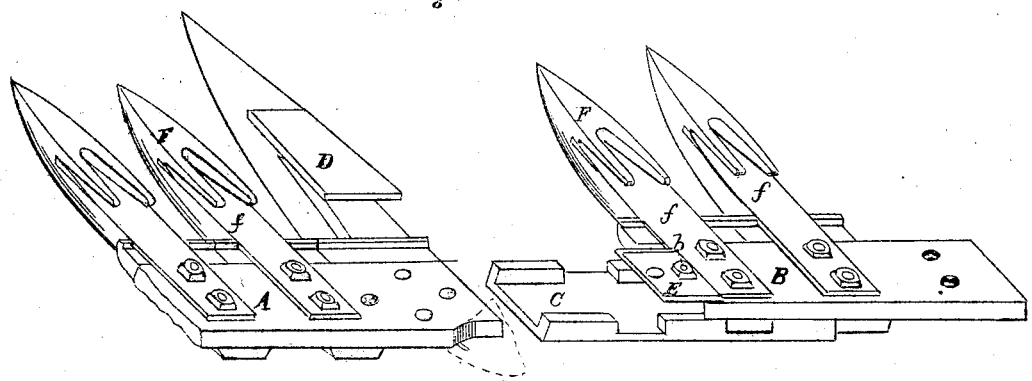
Figure 3:
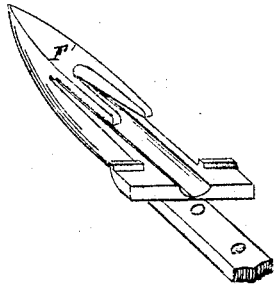

Figure 1 represents a view in perspective of a portion of a cutting apparatus embracing my improvements, the finger-beam being shown with its sections united to form a long beam in order to cut a wide swath, as in reaping. Fig. 2 represents a similar view of the same with its sections disconnected in order to shorten the bar and cut a narrow swath, as in mowing. The red lines in this figure show the divider as applied to the end of the mowing-section. Fig. 3 represents a similar view of one of the guard-fingers detached from the beam.

My invention consists in so connecting the two sections of the finger-beam by means of an overlapping brace-bar under the sections and an overlapping plate above the beam that the beam shall be firm and rigid to resist the strains to which it may be subjected, and yet the action of the cutting apparatus will not be impeded by the brace, as hereinafter shown.

In the accompanying drawings, (which represent a convenient arrangement of parts for carrying out the objects of my invention,) the finger-beam is represented as composed of two sections, A and B, connected by means of an overlapping brace-bar, C, underneath the beam. This brace-bar and the two sections A B are securely united by means of nuts and screw-bolts, in a manner clearly shown in the drawings. The screw-bolts pass through both the brace-bar and sections, and the brace-bar is countersunk on its under side, in order to prevent the projection of the bolt-heads beneath the bar. The inner or mowing-section, A, is attached to the main frame of the machine. A divider, D, is secured on the end of the outer section, B, by my means of two screw-bolts, $d$, in such manner that it may readily be detached when required. When the two sections are united, as shown in Fig. 1 of the drawings, the beam is as firm and rigid as if formed of a single piece, and by varying the length of the outer section a swath of any desired width may be cut.

In order to prevent foreign substances from entering the joint between the two sections, and to strengthen the beam against vertical strains, I use an overlapping plate, E, bolted to both the sections and the brace-bar by screws and nuts $a\ b$, one bolt passing through the inner section, A, the other through the outer one, B.

For convenience of connecting and disconnecting the two sections, and in order to secure other advantages, I prefer to use a cutter and guard-fingers of the construction shown in the drawings, though other forms may be given to these parts without affecting the principle of my invention. In this instance the fingers F F' are made of the form shown in Fig. 3. They are secured to the under side of the beam by screw-bolts and nuts, which bolts pass up through the beam and through steel plates $f$, which lie upon the beam and extend over the fingers, forming a cutting-edge, over which the sickle G plays. As the plate E is flush with the upper surface of the finger-plate $f$, the cutter slides over it without obstruction.

As it is customary to supply two sickles to each machine, one with serrated edges for reaping and the other with smooth edges for mowing, they can be made of different lengths, and thus avoid any necessity for piercing them.

When the two sections are disunited, the end finger, F', of the mowing-section A is removed, and the divider D secured in its place, the same bolt-holes being used in either case, as shown in Fig. 2, and the arrangement being such that the ends of the mowing-section A and the outer side of the divider are flush and smooth.

I am aware that it has been proposed to vary the width of swath cut by causing the finger-beam to slide endwise in its supports under the main frame, and do not claim any such device, it being impracticable for many reasons which will be obvious to those familiar with the construction and operation of harvesting-machines.

What I claim under this patent as my invention, and desire to secure by Letters Patent, is—

The combination, in a finger-beam, of the two sections A and B with the brace-bar C and overlapping plate E, when constructed and connected substantially in the manner and for the purpose described.

In testimony whereof I have hereunto subscribed my name.

ADAM R. REESE.

Witnesses:
 JOHN S. BACH,
 JEREMIAH REESE.